US006679121B2

(12) United States Patent
Sonnichsen et al.

(10) Patent No.: US 6,679,121 B2
(45) Date of Patent: Jan. 20, 2004

(54) BLADE VIBRATION TEST APPARATUS AND METHOD

(75) Inventors: H. Eric Sonnichsen, Stow, MA (US); Paul H. Wawrzonek, Bondsville, MA (US); Richard B. Connell, Shrewsbury, MA (US); Borislav D. Milatovic, Hudson, MA (US)

(73) Assignee: Test Devices, Inc., Hudson, MA (US)

( * ) Notice: Subject to any disclaimer, the term of this patent is extended or adjusted under 35 U.S.C. 154(b) by 32 days.

(21) Appl. No.: 09/994,380

(22) Filed: Nov. 6, 2001

(65) Prior Publication Data
US 2002/0083772 A1 Jul. 4, 2002

Related U.S. Application Data

(63) Continuation-in-part of application No. 09/900,528, filed on Jul. 6, 2001, now abandoned.
(60) Provisional application No. 60/273,697, filed on Mar. 5, 2001, and provisional application No. 60/216,899, filed on Jul. 7, 2000.

(51) Int. Cl.[7] ................................................. G01H 1/00
(52) U.S. Cl. ............................................ 73/660; 73/671
(58) Field of Search .......................... 73/660, 671, 577, 73/579, 581, 582, 583, 570, 455, 456, 457, 460, 462; 702/33, 34, 35, 36, 56

(56) References Cited

U.S. PATENT DOCUMENTS

| 4,019,375 | A | * | 4/1977 | Ellis et al. .................... 73/583 |
| 4,028,524 | A | * | 6/1977 | Moll et al. ............. 219/121.69 |
| 4,350,043 | A | * | 9/1982 | Jones .......................... 73/579 |
| 4,380,172 | A | * | 4/1983 | Imam et al. .................. 73/659 |
| 4,776,216 | A | | 10/1988 | Barton et al. ................. 73/660 |
| 5,541,857 | A | * | 7/1996 | Walter et al. ............... 700/280 |
| 5,553,501 | A | | 9/1996 | Gaddis et al. ................ 73/662 |
| 5,974,882 | A | | 11/1999 | Heath .......................... 73/579 |
| 6,085,593 | A | | 7/2000 | Pileri et al. ................... 73/663 |

FOREIGN PATENT DOCUMENTS

| JP | 361130841 A | * | 6/1986 | .................... 73/66 |

* cited by examiner

Primary Examiner—Richard A. Moller
(74) Attorney, Agent, or Firm—Hamilton, Brook, Smith & Reynolds, P.C.

(57) ABSTRACT

An apparatus and method for testing vibration in a bladed disk includes a motor-driven rotor upon which the bladed disk can be attached. At least one nozzle coupled with a liquid source is positioned to direct liquid from the liquid source to a position where it would impact at least one blade of the rotating bladed disk. The stress state and/or position of a rotating blade, so impacted, can be monitored to test its vibration characteristics.

36 Claims, 3 Drawing Sheets

BLADE VIBRATION TEST APPARATUS AND METHOD

RELATED APPLICATIONS

This application is a continuation-in-part of U.S. patent application Ser. No. 09/900,528, filed on Jul. 6, 2001, abandoned, which claims the benefit of U.S. Provisional Application No. 60/216,899, filed on Jul. 7, 2000, and U.S. Provisional Application No. 60/273,697, filed on Mar. 5, 2001. The entire teachings of all of the above applications are incorporated herein by reference.

GOVERNMENT SUPPORT

The invention was supported, in whole or in part, by a grant, Contract No. F33615-98-C-2930, from the United States Air Force. The Government has certain rights in the invention.

BACKGROUND OF THE INVENTION

High-speed continuous flow engines ("turbomachines") are composed of a series of rotating disks with blades on their periphery. The rotating bladed disks ("stages") are separated by sets of evenly-spaced stationary vanes, necessary to direct the flow properly into each succeeding stage. Both the stationary vanes and the rotating blades are subject to vibration, usually induced by evenly-spaced circumferential variations of the density, pressure, or momentum of the working fluid of the engine. These vibrations lead to stress that can damage or even fracture the blades.

Blades are subject to resonant vibration at multiple frequencies, each corresponding to a particular vibration pattern or "mode." As an individual blade passes through the field of repetitive variations in the flow field, ("vane wakes"), the flow variation exerts a periodic force on the blade much like the force exerted by a picket fence against a stick held by a running child. The periodic force is often called the "forcing function." At particular operating speeds, the forcing function frequency corresponds directly with one of the resonant frequencies of the blade. In that circumstance, the blade vibration amplitude can be destructively high, and cause a fatigue failure of the blade. This sort of blade failure is commonly described as "HCF" (High Cycle Fatigue) behavior. HCF failure of a single blade often leads to complete destruction of the engine.

Because of the risks posed by HCF failure, it is important to characterize the vibration modes and fatigue resistance of blades during the engine design and evaluation process. With existing techniques, this characterization is performed on complete engines, and requires expensive and complex instrumentation. Measuring the behavior of an individual stage with these techniques requires many hours of preparation and testing, and the difficulties in acquiring the necessary data makes it impractical to evaluate HCF behavior adequately during engine development. Consequently, HCF failures occur in operation at an unacceptable rate.

One method for controlling the amplitude of the destructive vibration resulting from HCF excitation is to damp the rotor. Engine manufacturers are investigating a number of different ways to achieve a sufficient level of damping without adversely affecting engine performance or lifetime. These new methods all require testing for validation and certification.

SUMMARY OF THE INVENTION

Apparatus and methods described herein can be used to test the blades of machinery, including a turbomachine, in an environment that simulates conditions encountered in normal operation, such as centrifugal stress and the high-cycle fatigue (HCF) forcing function. Examples of components for which the apparatus is useful include the compressor, fan, or turbine blades of jet aircraft engines. The apparatus and methods are useful in testing other kinds of machines as well, including, but not limited to, industrial compressors, aircraft propellers, and industrial turbines.

An apparatus for testing vibration in a bladed disk includes a motor-driven rotor upon which a bladed disk can be attached. At least one nozzle coupled with a liquid source is positioned to direct liquid from the liquid source to a position where it would impact at least one blade of the rotating bladed disk. A nozzle can comprise, for instance, a liquid jet for directing a solid stream of liquid onto the bladed disk. In other embodiments, the nozzle can be an atomizing nozzle to distribute liquid over a larger surface area of the blade and increase the time of contact between the liquid and blade. The stress state and position (relative to a datum or other blades) of a rotating blade subjected to the liquid impact can be monitored to determine its vibrational characteristics.

The apparatus generally includes a rotor attached to and driven by a motor or other torque-producing device. A bladed disk can be attached to the rotor and driven as a single-balanced assembly. At least one nozzle coupled with a liquid source is positioned to direct liquid from the liquid source to a position radially extended from the axis of rotation of the rotor such that the liquid can impact at least one blade of the rotating bladed disk. In methods described herein, the stress state and/or position of a rotating blade is monitored as liquid is directed against at least one blade of a rotating bladed disk.

Bladed disk assemblies can be excited at specific frequencies by applying a steady state, controlled periodic force directly to the blades in an evacuated chamber while the disk spins at a fixed speed, or sweeps through a range of speeds. Specifically, the disk and blade rotor assembly or integrally-bladed rotor can be mounted in a vacuum chamber and attached to a drive shaft. A plurality of liquid nozzles can be evenly spaced around the periphery of the disk and arranged so the liquid interacts with the blades as the rotor spins. The blades impart momentum to the liquid, and in doing so are subjected to the reaction impulse. This reaction impulse is the forcing function applied to the blades to achieve the desired vibrational response. The liquid stream/spray can comprise any liquid with vapor pressure equal to or lower than the operating pressure of the chamber.

The apparatus and methods described herein provide a straightforward and reliable means for characterizing the vibration modes and fatigue resistance of blades. One advantage provided by some embodiments of the invention is the ability to control the frequency of excitation by controlling the rate of rotation of the disk and the number of nozzles or nozzle arrays. In addition, the amplitude of the forcing function can be controlled by careful metering of the liquid flowrate. Finally, because a liquid is used to generate the forcing function, the test chamber can be operated at very-low pressure, thereby reducing drag on the rotating blades, and minimizing power requirements.

The apparatus and methods of the present invention permit the application of a variable frequency, adjustable amplitude forcing function to a bladed assembly while the bladed assembly spins at operating speeds. High-speed rotation is important from a blade evaluation standpoint, because the mode shapes, resonant frequencies, and fatigue life of the blades are all strongly influenced by the rotation-induced centrifugal stress encountered during operation.

The invention can be used to characterize and evaluate a variety of rotor variables. For instance, the endurance limit of a part that is simultaneously subjected to centrifugal stresses and HCF excitation can be determined by dwelling at a specified resonance and strain level until the part begins to fail. Also, the damping characteristics of a part can be determined through analysis of strain gage data obtained through an HCF test. Moreover, data from an HCF test can be used to generate forcing functions for use as inputs to analytical models of the object under study. The results of the analysis can then be correlated with test data for model verification.

Figure 1:
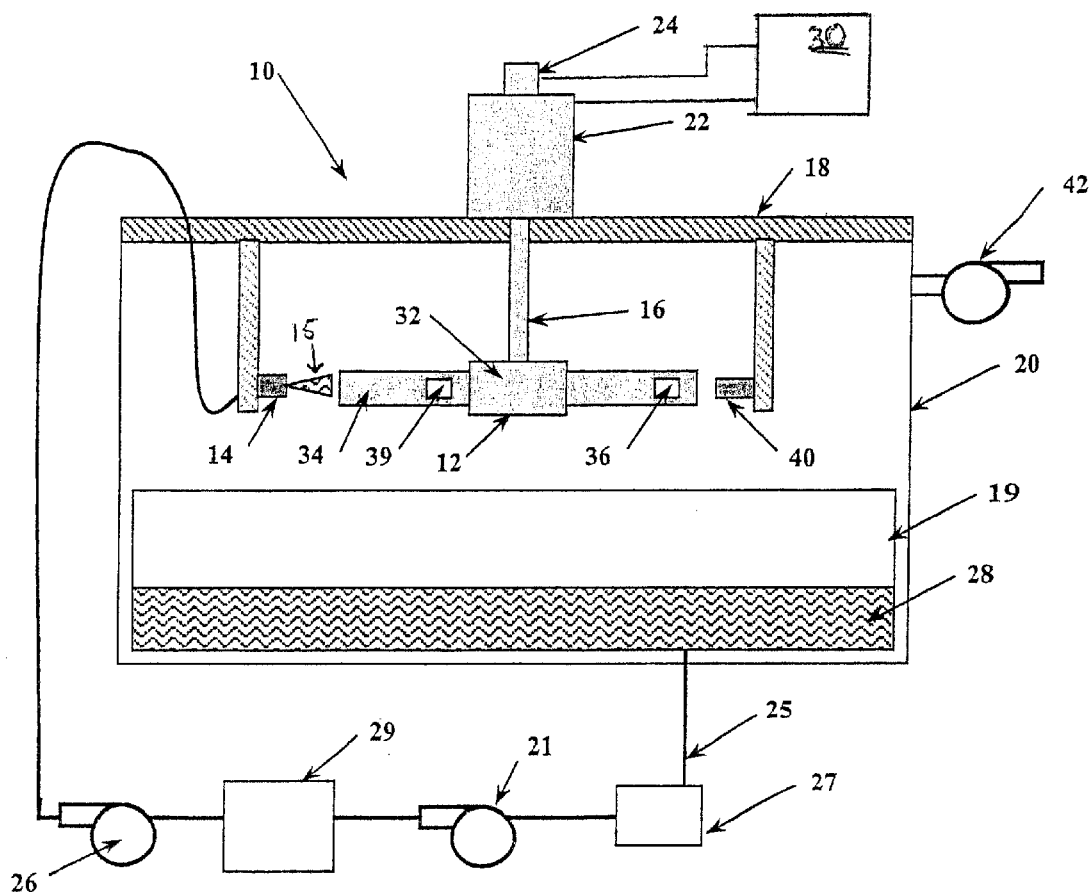
FIG. 1 is a sectional view showing a schematic diagram of an apparatus for characterizing the vibration in a bladed disk according to the invention.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

FIG. 1 shows an apparatus for creating vibratory stress in a rotating bladed disk. The bladed disk or disk blade assembly 12 is mounted concentrically on rotor shaft 16, which is driven by motor 22. The motor 22 is affixed to the lid 18 of vacuum chamber 20. The rotor shaft 16 passes through chamber lid 18 into the vacuum environment. Individual jets or jet arrays 14 are arranged to provide evenly spaced streams 15 of liquid 28, such as oil, against the blades 34.

The blades 34 and disk 32 are accelerated, decelerated, and/or held at constant speed by motor 22. Pump 26 is operated by an external, variable-speed controller to withdraw liquid 28 from a reservoir within chamber 20. The liquid 28 is drawn through conduit 25 from the reservoir 19 and pressurized by pump 26 to flow from the jets 14 at a controlled velocity. As blades 32 strike the liquid streams 15, impulsive forces are applied to the blades 34 by the resulting transfer of momentum from the blades 34 to the fluid 28.

An external reservoir 29 can optionally be added to the system to supplement reservoir 19 and minimize the volume of liquid 28 in the vacuum chamber 20. Heaters and/or coolers can be incorporated into reservoir 29 to maintain the liquid temperature within specified limits.

Sump tank 27 and scavenge pump 21 can also optionally be employed to transfer liquid 28 from reservoir 19 to external reservoir 29 so that there can be at least one level of redundancy in maintaining vacuum conditions within chamber 20.

Vibration amplitude is measured by strain gauges 36 (such as conventional resistive strain gauges) affixed to blades 34. Wires are connected to the strain gauges 36 and pass through the hollow rotor shaft 16 to slip ring 24. A suitable slip ring, motor, and shaft are produced by Test Devices, Inc., of Hudson, Mass. The slip ring 24 is electrically coupled with a conditioning unit, which can be a computer 30, that measures a voltage signal from the strain gauge, the voltage being related to the strain in the blade by the gage factor and calibration data. A display can be coupled with the conditioning unit to display the alternating-current component of the voltage signal, showing its frequency and amplitude, which in turn, reflects the frequency and amplitude of vibration in the blade. In lieu of, or in addition to, strain gauges applied to the blades, vibration amplitude can be measured by non-contact sensors 40 at the blade tip using time of arrival techniques, or by laser optical vibrometry. Finally, temperature sensing gages 39 can be attached to the blades 34 to monitor the rotor temperature during test execution.

The fundamental forcing frequency is the product of the disk-rotation frequency and the number of equally spaced liquid streams. The number of liquid streams and their location, orientation relative to the blade, impact area on the blade surface, and volume flowrate can be varied to adjust the frequency and level of excitation of the blade vibratory response. For example, the position of the jets 14 can be changed relative to the blade orientation and direction of travel, to change the duration of the impulse by varying the contact angle of the liquid stream 15 on the blade 34. When the stream is parallel to the blade surface at impact (Normal Velocity Case), the force it imparts to the blade is high but the time of application is short. This sharp, brief impulse provides a rich forcing function frequency spectrum, exciting harmonic vibrations at multiples of the blade passing frequency (number of blades multiplied by rate of rotation). Conversely, when the liquid stream 15 is directed at an angle with respect to the blade surface, the duration of the impulse is extended, and the peak force level is reduced. This broader force pulse reduces the amplitude of higher frequency harmonics, and concentrates the vibratory energy at the blade passing frequency. Additionally, a liquid stream that is not parallel to the blade surface can be directed such that its velocity vector decreases the impact force (Co-Velocity Case) or increases it (Counter Velocity Case).

The location of the jets 14 relative to the blade path can be adjusted to emphasize excitation of particular modes of vibration. Each blade 34 is characterized by several modes of vibration. For example, typical blades have resonant modes with the blade twisting about the long axis of the blade (i.e. a "torsional" mode). The same blade has multiple bending modes with the blade bending about an axis or axes normal to the blade long axis. Each of these modes can be excited more or less strongly by controlling the liquid stream impact area on the blade. A stronger response will result from the liquid contact area coinciding with a blade location having a large vibratory amplitude, known as an "antinode." Similarly, aligning the liquid contact area to a blade location with no vibratory motion (i.e. a "node") results in a lower excitation level. The excitation amplitude is therefore a function of the liquid stream contact area on the blade relative to the blade nodes and anti-nodes associated with the vibratory mode of interest.

Three basic parameters can be specified to define the testing requirements for a given test object. The contact area of the liquid impinging on the blade can be defined so that the liquid contacts the blade in a manner that produces the desired vibratory response (e.g., bending, torsion, panel modes). Secondly, the momentum transferred from the blade to the impinging liquid should be specified so that the liquid flow rate can be set. Finally, the number of liquid jets 14 or jet arrays is selected to create the required number of impulses per rotor revolution, which is known as the engine order. Combining these requirements with the characteristics of the bladed disk and the rotor test speed, the test environment required to excite a given vibrational mode of the test object can be fully defined.

The mass flow-rate of the liquid stream can be altered by changing the diameter, or cross-sectional area, of the jet orifice so as to control the strength of the excitation, and thus the blade vibration amplitude. Assuming a constant liquid stream velocity, increasing the cross-sectional area of the stream increases the impulse force in direct proportion. A larger diameter stream has greater mass, and therefore the impulse force is proportionally larger. Variable-diameter liquid jets can be made with a tapered pin in the exit plane of the jet with the pin position set by servomechanism. As the pin is moved axially, the annular clearance around the pin changes so that the net area of the orifice at the jet outlet is adjusted.

The liquid mass flow-rate, and thus the strength of the excitation, can be also controlled by changing the liquid velocity. Increasing the nozzle pressure while holding the diameter constant, for instance, results in an increase in liquid velocity. As the velocity of the liquid is increased, the stream is able to penetrate farther onto the blade, radially or axially, depending on the nozzle orientation. This results in a contact area on the blade that is approximately equal to the product of the width (nozzle diameter) times the length (length of the liquid stream). In some cases, there is a high blade passing frequency (blades passing a fixed point per unit time), as happens with a rotor with a high blade count, high rotational speed, or both. High blade passing frequencies require a high liquid stream velocity in order to get an appreciable amount of liquid onto the blade prior to its passage through the liquid.

Although the above discussions have focused solely on a solid liquid stream flowing continuously, it will also be understood that the liquid jets 14 can be operated to generate pulsed streams of liquid. The liquid flow rate, contact area, and momentum transfer are then calculated based on the characteristics of the liquid pulses.

Figure 2:
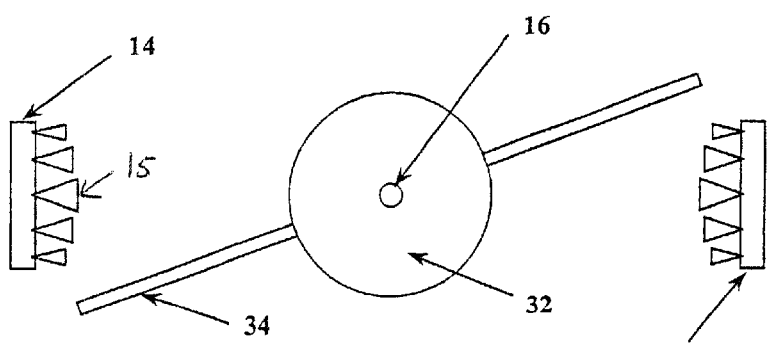
FIG. 2 is a top view of arrays of jets positioned about a bladed disk.

As shown in FIG. 2, multiple arrays of jets 14 providing liquid streams can be evenly spaced around the periphery of the disk 32, with each array producing identical patterns of liquid streams. The arrays are configured to provide a forcing function with a suitable amplitude profile as a function of time. For example, under some circumstances, it is desirable to impart a particular force-time profile to a given blade in order to excite a given vibrational mode at its associated frequency. A particular spectral component can be emphasized by using an array of individual jets that produce liquid streams at different diameters, with the arrays being evenly spaced around the circumference of the rotor. To produce a half-sine function, the first stream in the array to contact the blade would be of small diameter, the second somewhat larger, and so on to a maximum at the center of the array; the array would be symmetrical about the center nozzle position to produce a half-sine wave. Such an arrangement would approximate a spectrally pure forcing function, applying excitation energy at only the frequency determined by the product of the rotor rotational speed and the number of arrays around the rotor circumference.

The liquid jet arrays can be arranged so that the liquid streams in each array interact with the blade surface simultaneously and thereby modify and/or increase the magnitude of the impulse. For example, in an embodiment with three jets 14 in each array, the forcing function is three times as strong as if there were only one jet. Such multiple clusters permit easy control of the magnitude of the forcing function by turning individual streams on and off with an electric valve.

Figure 3:
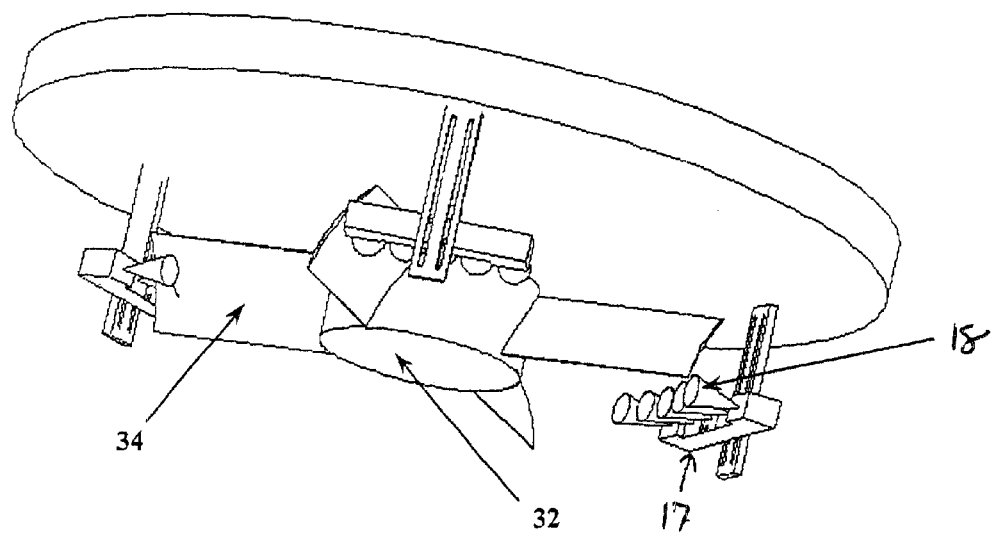
FIG. 3 is an isometric view of an apparatus for characterizing the vibration in a bladed disk.
Figure 4:
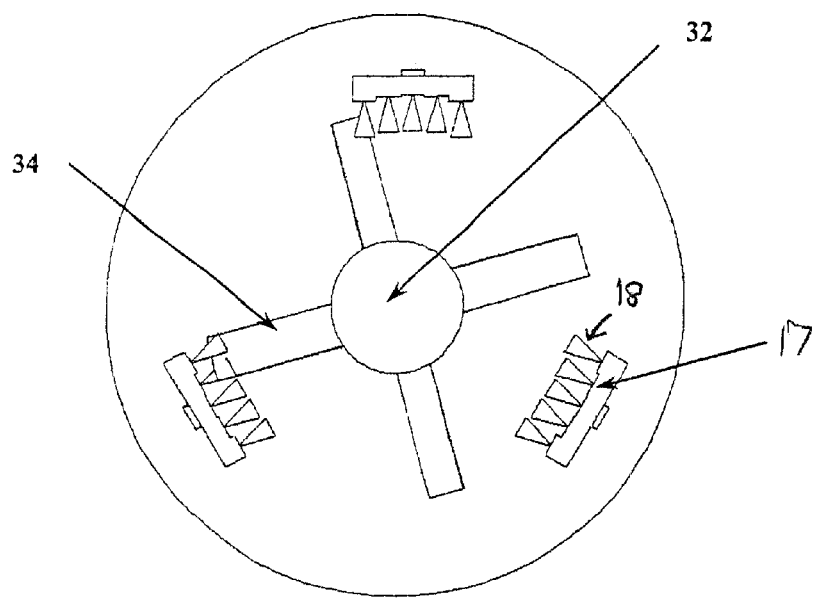
FIG. 4 is a bottom view of the apparatus of FIG. 3.

The nozzle arrays can also be arranged such that there is a longer time of passage of the blade through the liquid streams. As shown in FIG. 3 and FIG. 4, this arrangement allows for tuning of the system so that the relative excitation and quiescent periods of the blade travel can be carefully controlled to achieve the desired vibratory response.

In a test procedure, the rate of blade 34 rotation and the configuration and positioning of jets 14 are set to generate specific blade vibratory responses. There are two basic types of tests that are performed to characterize the behavior of a particular bladed disk. A sweep is a test protocol where a minimum and maximum rotor speed is set along with acceleration and/or deceleration (sweep) rates. This type of test is used to identify and/or confirm, over a wide speed range, blade vibratory responses whose frequency is the instantaneous rotor speed times the number of liquid nozzle arrays.

The second type of test is a dwell test where the rotor speed is held constant at a speed corresponding to the blade vibratory response of interest. This type of test requires that a speed controller for the motor 22 maintain the rotor speed at its set point, with the maximum speed variation being a function of the rotor damping. For lightly damped rotors, maximum acceptable rotor speed variations are in the range of plus or minus one revolution per minute. The amplitude of the blade response builds to a maximum during the dwell period and remains at that level until a shift in the resonant response causes a reduction in the vibration amplitude. The resonance shift can result from rotor heating, from a developing fault in the rotor, or any other factor or combinations of factors that alter the vibratory response of the blade. Voltage signals from the strain gauges 36 are monitored to identify resonant peaks, which are characterized by a local maximum of the amplitude of the alternating-current component of the strain gage voltage signal. Local maximum amplitudes occur whenever the forcing function frequency matches the blade resonant frequency, thereby producing a synchronous vibration.

A strain/frequency tracking algorithm can be employed which uses real-time strain gage data as a feedback control signal to the motor speed controller, which can be computer 30. This software negates the need for an operator to manually control the rotor speed, which can be difficult due to the dynamics of the test conditions and the shifting resonant frequency. The algorithm continuously tracks the blade strain response and adjusts the rotor speed such that a maximum strain response is maintained. In a preferred arrangement, the algorithm prevents a loss of rotor speed control resulting from a rapidly changing blade resonant frequency which can be caused by, among other factors, a failing rotor.

The amount of vibration damping in the blade can be evaluated by measuring the ratio of the amplitude to the width of the voltage spike from the strain gage. A spike of high amplitude and narrow width indicates that there is little vibration damping in the blade. Such findings can be used to redesign the shape, composition or surface treatment of the blade to provide increased damping and consequently reduce the risk of fatigue failure. The findings can also be used to modify the number and/or position of the stationary vanes that act as air-flow barriers upstream from the bladed disk. Test data can be used to determine parameter values needed to alter the frequency or shape of the forcing function acting on the blades. In addition, the present invention can also provide important information regarding the blade vibratory response at particular resonant frequencies. Using this information, the operating parameters of the turbomachine incorporating the particular bladed disk may be designed so that the machine will not operate for extended periods at potentially destructive operating speeds.

A vacuum pump 42 can be used to maintain the test chamber 20 at low absolute pressure (vacuum) to reduce required drive power and to prevent friction heating of the blades 34 by the air in the chamber 20. However, the pressure generally should be maintained at a level high enough to prevent boiling of the liquid. In those circumstances that require operation at some positive absolute pressure, (to provide aerodynamic damping, for example) the chamber 20 can be filled with inert gas (such as nitrogen or argon) to prevent explosion or deflagration of the liquid used in the excitation system. A coolant or refrigeration source can be used to cool the gas if the chamber 20 is operated at significant absolute pressure. Additionally, the liquid 28 may be cooled prior to its introduction into the vacuum chamber 20 to increase the safety of operation and to aid in keeping the rotor at the desired test temperature. Finally, the liquid 28 may be heated when the test protocol specifies an elevated test temperature. Great care must be exercised in performing a heated test since a number of ignition sources are available (e.g., electric devices, sparks from a failed rotor, etc.), and deflagration of the heated and atomized liquid 28 is possible if an inert atmosphere is not maintained in the vacuum chamber 20.

While the above embodiments illustrate precision-orifice liquid jets producing solid liquid streams, it will be understood by those in the art that alternative nozzles and nozzle configurations may be substituted. In particular, it has been shown that conventional atomizing nozzles may be utilized to distribute the liquid over a larger surface area and expand the time of contact between the oil and blade. One advantage in using atomizing nozzles over precision-orifice jets is that the atomizing nozzle mitigates erosion damage to the test article, particularly when bladed assembly is rotated at high-speeds and/or for long duration tests. This test method characteristic has been experimentally demonstrated through testing where blade tip speeds of greater than 1600 feet per second have been maintained while atomized oil was ejected into the path of the blade. After long-duration exposure (greater than 10 million impacts), an examination showed no loss of material from the blade surface resulting from the liquid impacts.

Figure 5:
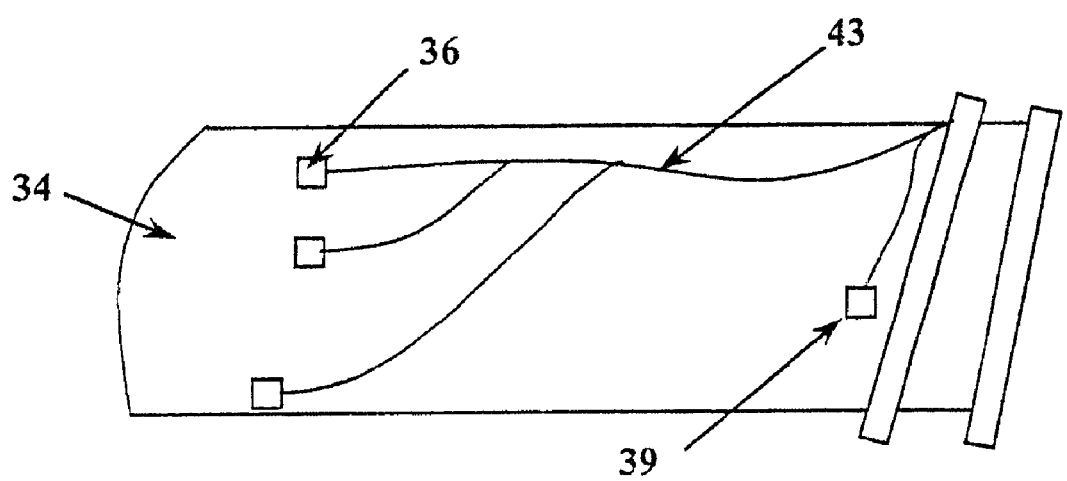
FIG. 5 is a side view of a turbomachine blade equipped with strain gauges.

FIGS. 3 and 4 illustrate two views of a bladed disk test assembly comprising three equally-spaced arrays of atomizing nozzles 17 mounted outboard of the blade tips such that a dispersed liquid spray 18 is directed radially inward to contact blades 34. In this illustration, the bladed disk 32 comprises a generic fan having four blades 34 mounted in a disk. As shown in FIG. 5, conventional strain gauges 36, electrically coupled with a conductive material 43, may be affixed to the blade 34 at suitable locations for measuring a voltage signal indicative of the vibration amplitude. In addition, temperature sensing gages 39 may be affixed to blade 34 to monitor blade temperature throughout a test. Although not shown, the blade may additionally comprise a damping mechanism, such as a mid-span clapper, to limit the vibration response.

Empirical results for blade excitation tests using various nozzle configurations, including precision-orifice jets and atomizing nozzles, at constant liquid flow rates, show little or no difference in excitation levels between different nozzle configurations. In general, it has been found that momentum transfer, rather than the concentration of the liquid impacting the blade, is the controlling variable with respect to the strain level achieved. Therefore, the choice of solid stream or atomized liquid for a particular application is based on factors other than the magnitude of the excitation force.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for testing vibration in a bladed disk, the apparatus comprising:
    a motor;
    a rotor attached to and powered by the motor, the rotor having an axis of rotation and being suited for attachment of a bladed disk thereto;
    a liquid source; and
    at least one nozzle coupled with the liquid source and positioned to direct liquid from the liquid source to a position radially extended from the axis of rotation of the rotor such that the liquid can impact at least one blade of a rotating bladed disk attached to the rotor.

2. The apparatus of claim 1, further comprising a bladed disk attached to the rotor.

3. The apparatus of claim 2, wherein a plurality of nozzles are coupled with the liquid source and positioned to direct liquid from the liquid source to positions radially extended from the axis of rotation of the rotor such that the liquid from the plurality of jets can impact at least one blade of the bladed disk.

4. The apparatus of claim 3, wherein the plurality of nozzles include nozzles that have different orientations or flow characteristics to enable the tailoring of particular forcing functions on at least one blade of the bladed disk to excite or suppress a particular vibration mode.

5. The apparatus of claim 1, wherein the at least one nozzle includes at least one precision-orifice liquid jet.

6. The apparatus of claim 1, wherein the at least one nozzle includes an atomizing nozzle.

7. The apparatus of claim 1, wherein the liquid comprises oil.

8. The apparatus of claim 1, further comprising a chamber, wherein the nozzle is positioned to direct liquid into the chamber, and the rotor is positioned to allow a bladed disk attached to the rotor to be mounted within the chamber.

9. The apparatus of claim 8, further comprising a vacuum pump coupled with the chamber to control the pressure within the chamber.

10. An apparatus for testing vibration in a bladed disk, the apparatus comprising:
    a motor;
    a rotor attached to and powered by the motor, the rotor having an axis of rotation and being suited for attachment of a bladed disk thereto;
    a liquid source;
    at least one nozzle coupled with the liquid source and positioned to direct liquid from the liquid source to a position radially extended from the axis of rotation of the rotor such that the liquid can impact at least one blade of a rotating bladed disk attached to the rotor;

a chamber, wherein the nozzle is positioned to direct liquid into the chamber, and the rotor is positioned to allow a bladed disk attached to the rotor to be mounted within the chamber;

a vacuum pump coupled with the chamber to control the pressure within the chamber; and an internal reservoir within the chamber for collection of liquid discharged from nozzle.

11. The apparatus of claim 10, further comprising a conduit coupling the internal reservoir to at least one nozzle.

12. The apparatus of claim 11, further comprising:

an external liquid reservoir for storing liquid prior to recirculation into the chamber; and a temperature controller for controlling the temperature of liquid within the external reservoir.

13. The apparatus of claim 12, further comprising a scavenge pump to increase the rate of flow of liquid into the external reservoir.

14. The apparatus of claim 13, further comprising a sump tank between the internal reservoir and the scavenge pump for maintaining the integrity of the vacuum within the chamber.

15. An apparatus for testing vibration in a bladed disk, the apparatus comprising:

a motor;

a rotor attached to and powered by the motor, the rotor having an axis of rotation and being suited for attachment of a bladed disk thereto;

a bladed disk attached to the rotor;

a liquid source;

at least one nozzle coupled with the liquid source and positioned to direct liquid from the liquid source to a position radially extended from the axis of rotation of the rotor such that the liquid can impact at least one blade of a rotating bladed disk attached to the rotor; and at least one position-sensing gauge for measuring vibration in a blade of the bladed disk.

16. The apparatus of claim 15, wherein the position-sensing gauge is a strain gauge.

17. The apparatus of claim 16, wherein a plurality of strain gauges are attached to blades of the bladed disk.

18. The apparatus of claim 17, further comprising a slip ring coupled with the strain gauge.

19. The apparatus of claim 17, further comprising radio telemetry equipment coupled with the strain gauge.

20. The apparatus of claim 15, wherein the position-sensing gauge is in the form of non-contact position sensing instrumentation.

21. An apparatus for testing vibration in a bladed disk, the apparatus comprising:

a motor;

a rotor attached to and powered by the motor, the rotor having an axis of rotation and being suited for attachment of a bladed disk thereto;

a bladed disk attached to the rotor;

a liquid source;

at least one nozzle coupled with the liquid source and positioned to direct liquid from the liquid source to a position radially extended from the axis of rotation of the rotor such that the liquid can impact at least one blade of a rotating bladed disk attached to the rotor; and at least one temperature sensing gauge affixed to the bladed disk.

22. An apparatus for testing vibration in a bladed disk, the apparatus comprising:

a motor;

a rotor attached to and powered by the motor, the rotor having an axis of rotation and being suited for attachment of a bladed disk thereto;

a liquid source;

at least one nozzle coupled with the liquid source and positioned to direct liquid from the liquid source to a position radially extended from the axis of rotation of the rotor such that the liquid can impact at least one blade of a rotating bladed disk attached to the rotor; and a speed controller for controlling the rotational speed of the rotor.

23. The apparatus of claim 22, wherein the speed controller is adapted to receive a feedback control signal from a rotating bladed disk and adjust the rotational speed of the rotor in response to the feedback control signal so that a strain response is maintained.

24. An apparatus for testing vibration in a bladed disk, the apparatus comprising:

means for rotating a disk having at least one blade attached thereto;

means for directing liquid against at least one blade of the rotating disk; and means for monitoring at least one of a stress state or position of the blade.

25. A method for testing vibration in a bladed disk, the method comprising the steps of:

rotating a bladed disk;

directing liquid against at least one rotating blade of the bladed disk; and monitoring at least one of a stress state or position of the rotating blade.

26. The method of claim 25, wherein the liquid is directed against the rotating blade to generate a forcing function having a frequency corresponding to a fundamental or higher-order harmonic frequency of the rotating blade.

27. The method of claim 25, wherein the liquid is directed through nozzles positioned to have different orientations relative to the blade.

28. The method of claim 25, wherein the liquid is directed through different nozzles at different flow rates.

29. The method of claim 25, wherein the liquid is directed through nozzle orifices, the geometry of which changes as a function of time.

30. The method of claim 25, wherein the liquid is directed against the rotating blade at a forcing function that excites a harmonic frequency of the blade.

31. The method of claim 25, wherein the liquid is directed against the rotating blade at a forcing function that suppresses a harmonic frequency of the blade.

32. The method of claim 25, further comprising controlling the pressure in a chamber in which the bladed disk is rotated.

33. The method of claim 25, wherein the liquid is directed against the at least one rotating blade as a solid liquid stream.

34. The method of claim 25, wherein the liquid is directed against the at least one rotating blade as an atomized liquid spray.

35. A method of testing vibration in a bladed disk, the method comprising the steps of:

rotating a bladed disk;

a liquid against at least one rotating blade of the bladed disk; and monitoring at least one of a stress state or position of the rotating blade, wherein the stress state of the blade is monitored with strain gauges mounted on the rotating blades.

36. A method of testing vibration in a bladed disk, the method comprising the steps of:

rotating a bladed disk;

directing a liquid against at least one rotating blade of the bladed disk;

monitoring at least one of a stress state or position of the rotating blade; and generating a feedback control signal from the rotating bladed disk and adjusting the rotational speed of the disk in response to the feedback control signal so that a strain response is maintained.

* * * * *

UNITED STATES PATENT AND TRADEMARK OFFICE
CERTIFICATE OF CORRECTION

PATENT NO. : 6,679,121 B2  
DATED : January 20, 2004  
INVENTOR(S) : H. Eric Sonnichsen et al.

It is certified that error appears in the above-identified patent and that said Letters Patent is hereby corrected as shown below:

<u>Column 10,</u>
Line 66, before "a liquid", insert -- directing --

Signed and Sealed this

Eleventh Day of May, 2004

JON W. DUDAS  
*Acting Director of the United States Patent and Trademark Office*